US009046591B1

(12) United States Patent
Yang et al.

(10) Patent No.: US 9,046,591 B1
(45) Date of Patent: Jun. 2, 2015

(54) COORDINATE-FREE MEASUREMENT-DOMAIN NAVIGATION AND GUIDANCE USING LOCATION-DEPENDENT RADIO SIGNAL MEASUREMENTS

(75) Inventors: Chun Yang, San Mateo, CA (US); Di Qiu, Woodside, CA (US)

(73) Assignee: Sigtem Technology, Inc., San Mateo, CA (US)

( * ) Notice: Subject to any disclaimer, the term of this patent is extended or adjusted under 35 U.S.C. 154(b) by 698 days.

(21) Appl. No.: 13/282,683

(22) Filed: Oct. 27, 2011

Related U.S. Application Data

(63) Continuation-in-part of application No. 12/436,868, filed on May 7, 2009, now Pat. No. 8,063,825, and a continuation-in-part of application No. 13/037,603, filed on Mar. 1, 2011, now Pat. No. 8,164,514.

(51) Int. Cl.
| | | |
|---|---|---|
| *G01S 3/02* | (2006.01) | |
| *G01S 3/00* | (2006.01) | |
| G01S 5/02 | (2010.01) | |
| G01S 1/08 | (2006.01) | |

(52) U.S. Cl.
CPC .... *G01S 3/00* (2013.01); *G01S 3/02* (2013.01)

(58) Field of Classification Search
CPC ..................................... G01S 3/02; G01S 3/00
USPC .......... 342/457, 407, 417, 451, 455, 456, 458
See application file for complete search history.

(56) References Cited

U.S. PATENT DOCUMENTS

| | | | | |
|---|---|---|---|---|
| 6,256,506 | B1 * | 7/2001 | Alexander et al. | 455/456.4 |
| 6,496,701 | B1 * | 12/2002 | Chen et al. | 455/456.5 |
| 6,717,547 | B2 * | 4/2004 | Spilker et al. | 342/464 |
| 7,990,314 | B2 * | 8/2011 | Liao | 342/357.29 |
| 2002/0126046 | A1 * | 9/2002 | Counselman et al. | 342/464 |
| 2002/0132624 | A1 * | 9/2002 | Watanabe et al. | 455/456 |
| 2005/0046608 | A1 * | 3/2005 | Schantz et al. | 342/127 |
| 2012/0025977 | A1 * | 2/2012 | Schantz et al. | 340/539.13 |
| 2013/0229303 | A1 * | 9/2013 | Marshall | 342/357.29 |

* cited by examiner

*Primary Examiner* — Frank J McGue

(74) *Attorney, Agent, or Firm* — LaMorte & Associates, P.C.

(57) ABSTRACT

A system and associated methods for coordinate-free measurement-domain navigation and guidance utilizing a plurality of radio signals of opportunity, without knowing the coordinates of transmitters of said radio signals in a reference system that steers a user from an initial location to a destination without calculating coordinates in said reference system. In one embodiment, radio signal parameters comprise received signal strength indications, differential times of arrival, and sector angles from a user to at least a pair of radio sources and a combination thereof that are used for coarse navigation and guidance toward the vicinity of said destination. In another embodiment, radio signal parameters comprise temporal characteristics of radio signals, propagation channel impulse responses, radio signal power spectra, propagation channel transfer functions, and a combination thereof that are used for vernier navigation and guidance within the vicinity of said destination.

17 Claims, 8 Drawing Sheets

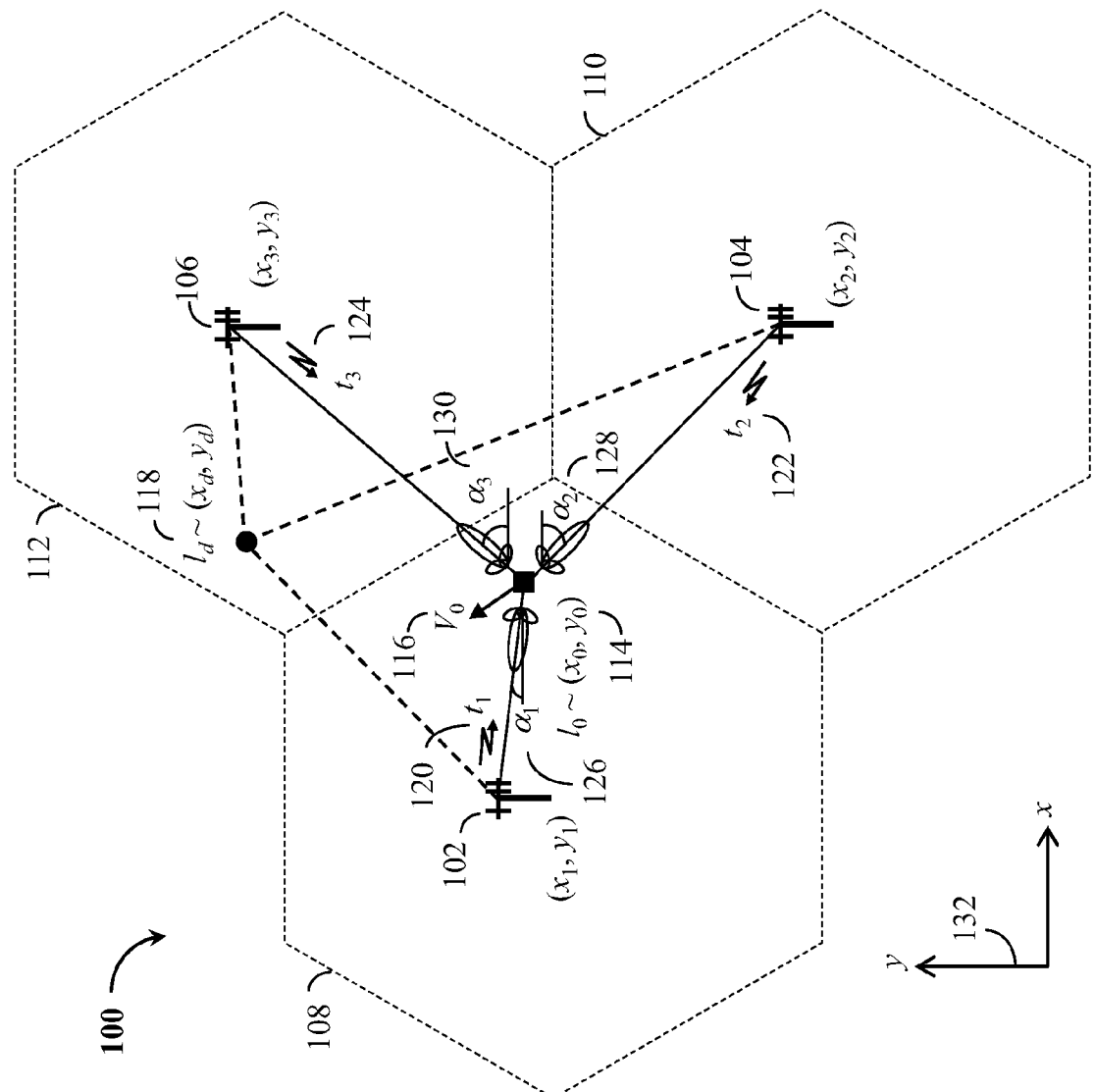

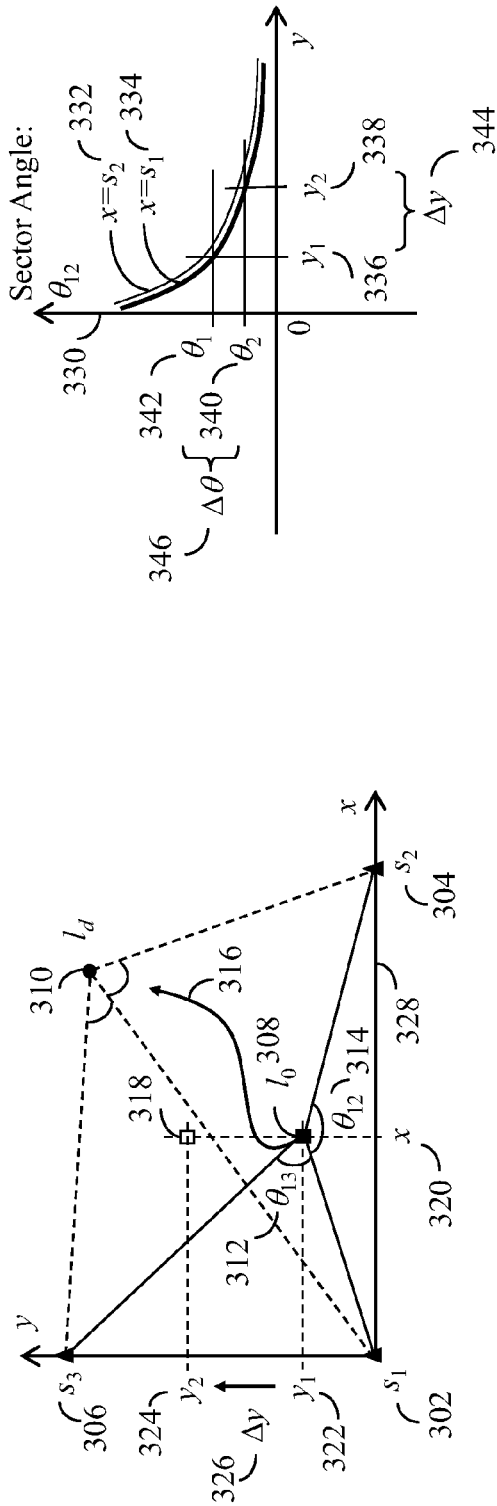
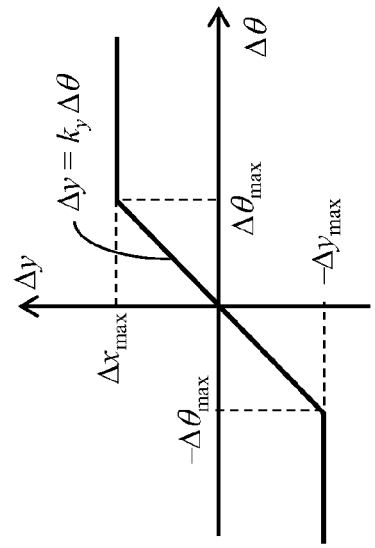
Fig. 3a
Fig. 3b
Fig. 3c

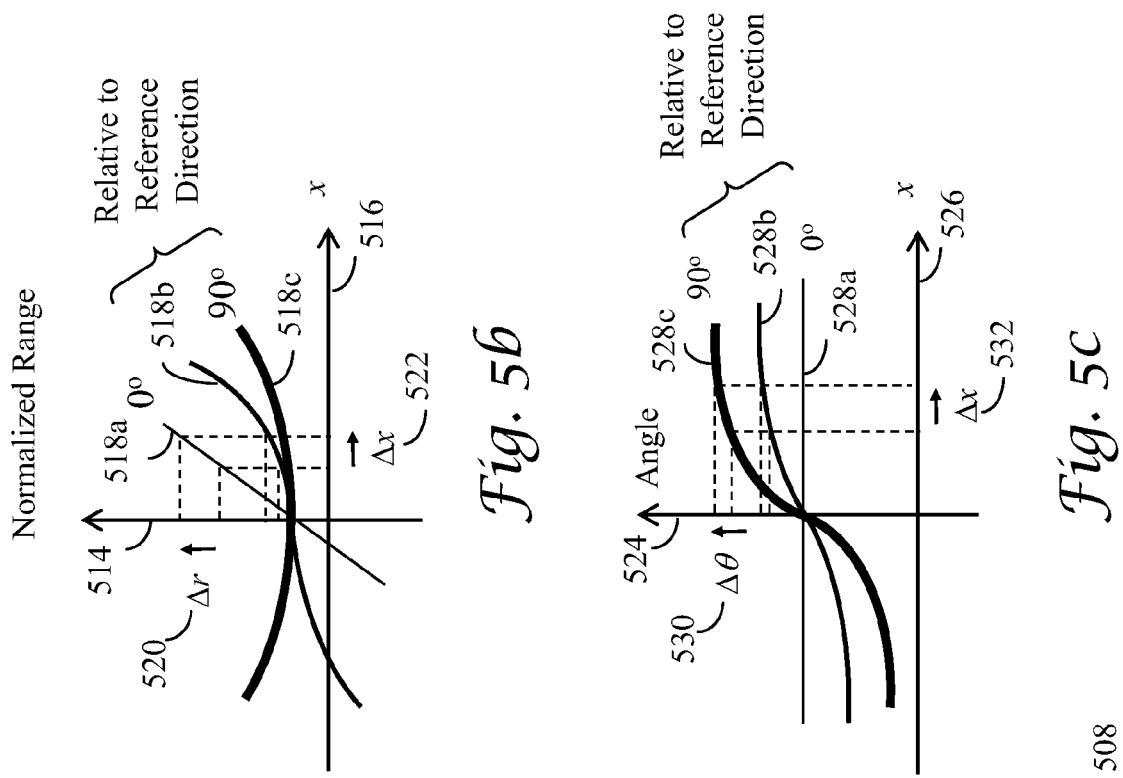
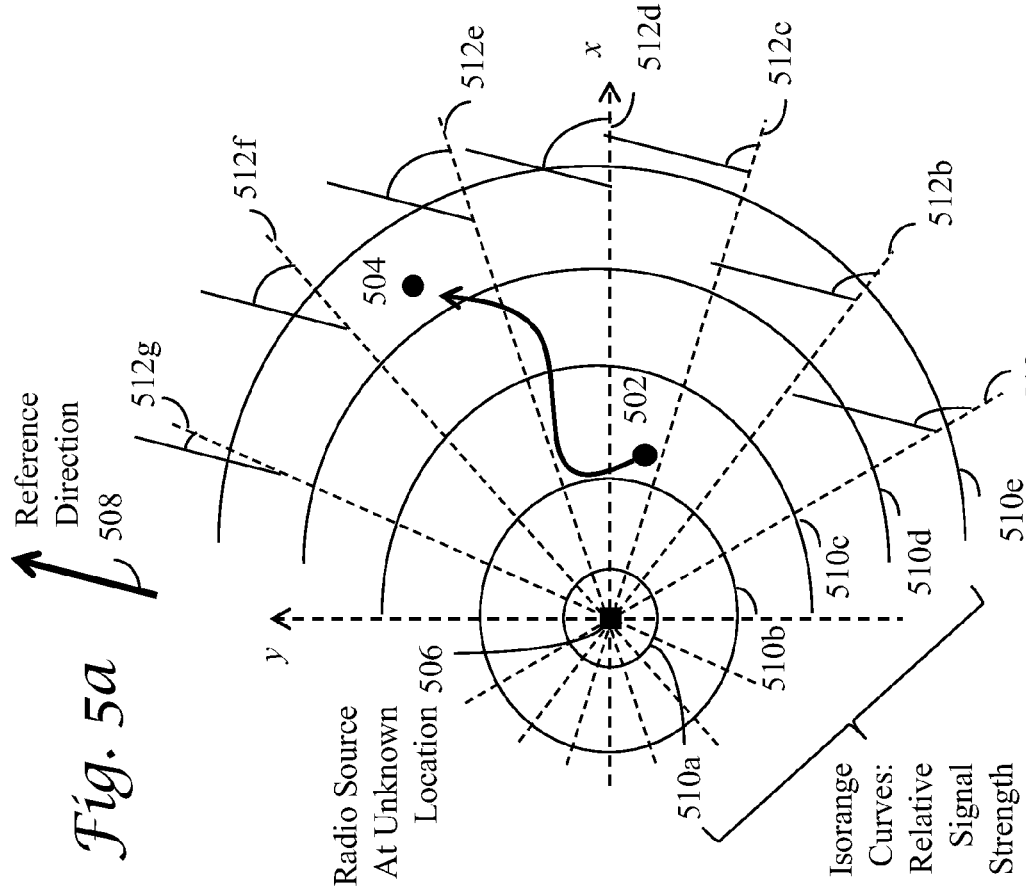

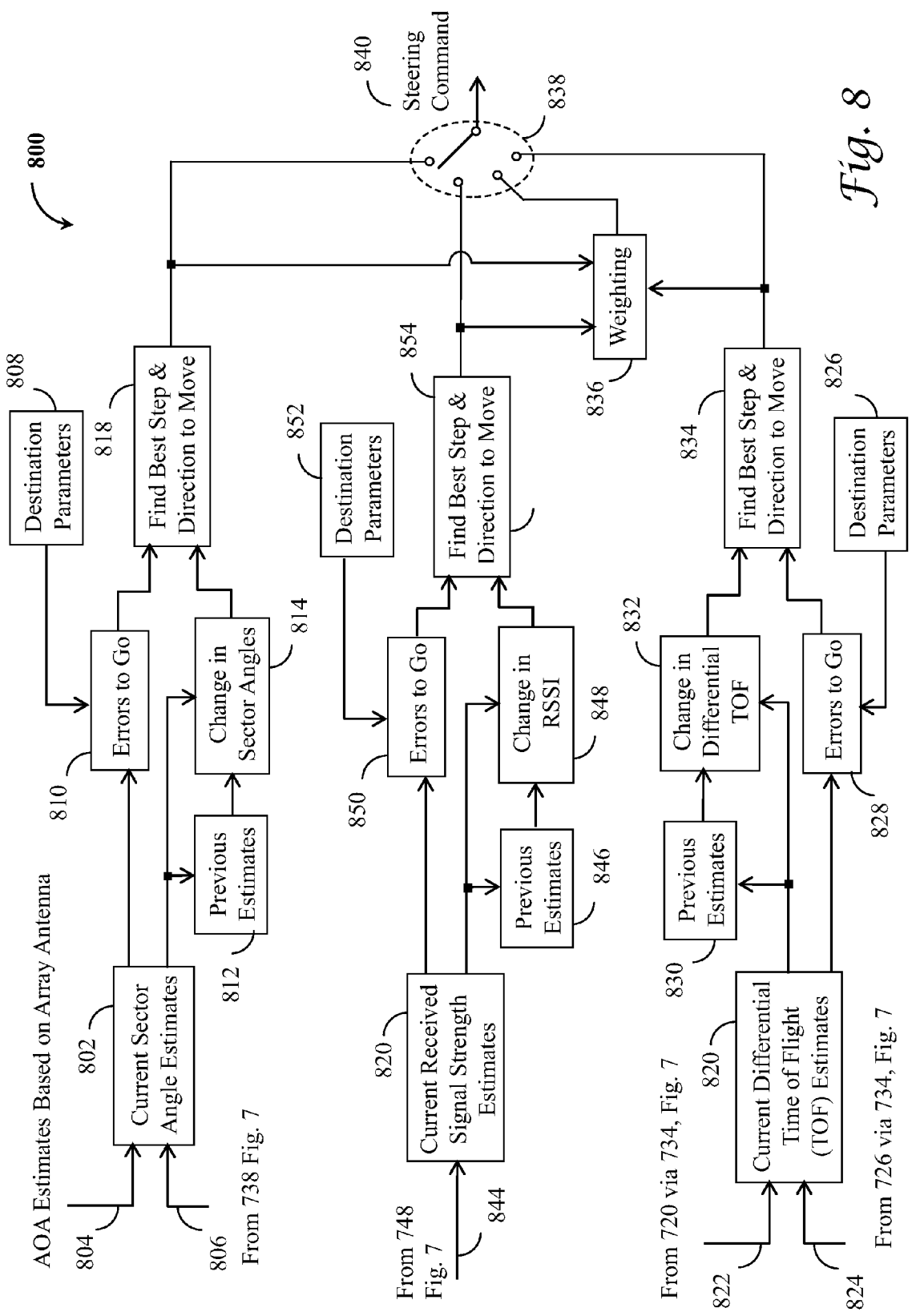

COORDINATE-FREE MEASUREMENT-DOMAIN NAVIGATION AND GUIDANCE USING LOCATION-DEPENDENT RADIO SIGNAL MEASUREMENTS

RELATED APPLICATIONS

This application is a continuation in part of the application Ser. No. 12/436,868, filed on May 7, 2009 now U.S. Pat. No. 8,063,825, and Ser. No. 13/037,603, filed on Mar. 1, 2011 now U.S. Pat. No. 8,164,514.

BACKGROUND OF THE INVENTION

1. Field of the Invention

The present invention relates generally to radio navigation and guidance and particularly to radio navigation and guidance using broadcast and wireless communication signals without knowing their transmitter locations.

2. Background of the Invention

In modern usage, navigation is confined to the art of determining the translational motion of a vehicle in terms of position and velocity, also referred to as a state vector. When the state vector is calculated on board the vehicle, the process is called navigation. When it is done off board, the process is called position location. Also defined in the book entitled Avionics Navigation Systems ($2^{nd}$ Ed.) by M. Kayton and W. R. Fried, J. Wiley & Sons, Inc., New York, 1997, an additional process is called surveillance when the state vector is measured on board a vehicle and reported to outside the vehicle for off board uses.

Navigation systems are categorized as positioning, which measures the current state vector independent of the path travelled by the vehicle in the past, and dead-reckoning, which derives the state vector from continuous measurements relative to an initial state. An example of dead-reckoning is an inertial navigation system (INS) based on an inertial measurement unit (IMU) using three-axis gyroscopes and accelerometers. Celestial navigation, map-matching, and radio navigation are three popular positioning systems. The present invention is related to a special form of map-matching based radio navigation in a unique way.

Guidance is the art of steering of a vehicle toward a destination. Such handling of a vehicle is also known more specifically as conning for ships, flight control for aircraft, and attitude control for spacecraft. Two forms are identified in the above-mentioned book by M. Kayton and W. R. Fried, namely, (1) toward a designation of known location from the vehicle's present location and (2) toward a designation without explicitly measuring the state vector. One example of the latter guidance law is the proportional navigation guidance in which a seeker captures a target in its field of view (FOV) and a guided vehicle then homes on radio, infrared, and visual emissions of the target until impact. The present invention sets forth a third form of guidance that steers toward a designation represented by location-dependent characteristics of radio signals or of other signals for that matter, without actually defining and knowing the geo-coordinates (state vector) of the destination.

A popular satellite-based radio navigation system is the Global Positioning System (GPS), fully operational since 1994. GPS relies upon a constellation of twenty-four satellites in six different orbit plans around the Earth for position location, navigation, survey, and time transfer. Each satellite carries a set of ultra precise atomic clocks and transmits pseudo-noise (PN) code-modulated signals at several frequencies. By tracking four or more satellites, a user can solve for the variables of longitude, latitude, altitude and time to precisely determine the user's location and clock offset. More details are provided in the book entitled Global Positioning System Theory and Applications (Vols. I and II), edited by B. W. Parkinson and J. J. Spilker Jr., AIAA, 1996.

Despite of its popularity, GPS cannot function well when the line-of-sight (LOS) view between a receiver and GPS satellites is obstructed due to foliage, mountains, buildings, or other structures. To improve GPS receiver sensitivity, one method is the assisted GPS (AGPS). The AGPS approach relies upon a wireless data link to distribute, in real time, such information as time, frequency, navigation data bits, satellite ephemeredes, and approximate position as well as differential corrections to special GPS receivers equipped with a network modem. GPS cannot function well either when GPS signal is heavily jammed or overwhelmed by unintentional interference. GPS signals may be turned off altogether when it orbits over certain region. In such circumstances, no GPS solution is available.

Recently broadcast and wireless communication signals have been considered as signals of opportunity (SOOP) for position location and navigation. Examples of SOOP include digital television (DTV) signals, AM/FM radio signals, mobile phone cellular network signals, and wireless local area network (WLAN or Wi-Fi) signals among others. These signals are designed primarily for indoor reception and in populated areas where GPS often fails to operate properly. There are many inventions disclosed that make use of such signals of opportunity for position location and navigation. This was fueled in part by the U.S. Federal Communications Commission (FCC) mandatory requirement of Emergency 911 (E911) for wireless communications services such as cellular telephone, wideband personal communications services (PCS), and geographic area specialized mobile radio (SMR). Many position location technologies using communication signals have been developed as described in the articles "Standardization of Mobile Phone Positioning for 3G Systems" by Y. Zhao in IEEE Communications Magazine, July 2002 (pp 108-116) and "Network-Based Wireless Location" by A. H. Sayed, A. Tarighat, and N. Khajehnouri in IEEE Signal Processing Magazine, July 2005 (pp 24-41).

However, a prerequisite for navigation and position location using the aforementioned methods, as described in the book entitled Wireless Location in CDMA Cellular Radio Systems, by J. J. Caffery, Jr., Kluwer Academic Publishers, Boston, Mass., 2000, is the accurate knowledge of base station locations for cellular phone network, satellite orbits for GPS, transmitter tower locations for DTV and AM/FM, and access point (AP) locations for Wi-Fi. In general, the locations of radio sources are specified in terms of a set of coordinates relative to a pre-established common reference system. A coordinate system can be an arbitrary grid with its axes referenced to an absolute geodetic coordinate system such as WGS-84. However, there are circumstances in which the location of the signal sources is difficult to determine a priori particularly for indoor environments. Besides, such transmitters as Wi-Fi AP can be easily moved around, thus a database with accurate Wi-Fi AP information is difficult to build and maintain. It is especially true for military and emergency operations for lack of pre-surveyed reference points when using temporary beacons or existing infrastructure in a hostile territory.

Another difficulty for radio navigation in indoor and urban environments is the presence of severe multipath and non line-of-sight (NLOS) signals. In fact, it is more a problem for time of flight (TOF)-based ranging than for communications.

A communication system can use, say, a rake receiver to combine signals from different paths to enhance signal to noise ratio (SNR) so as to reduce bit error rate (BER). Sometimes it is even desired to have NLOS signals to reach shadowed areas when the direct path is completely blocked. However, it is the translation of time of flight measurements corrupted by multipath and particularly NLOS signals into range that introduces the most significant errors into positioning, which is difficult to correct afterwards.

Yet, the radio signal propagation channels from fixed radio sources to a stationary receiver remain relatively stable for a given environment. The resulting spatial distribution of signal patterns is akin to standing waveforms produced by reflection, diffraction, refraction, and scattering of radio signals in the environment. Such a quasi time-invariant property of location-dependent radio frequency (RF) signatures, also known as RF fingerprints, has been used for transmitter authentication and position location. RF signatures-based position location consists of two steps. The first step surveys an area of interest by measuring the RF signatures at grid points of known location, thus establishing a database of RF signatures as a function of the grid location. In the second step, the RF signatures measured at an unknown location are compared with the database and when a match is found, the coordinates of the nearest grid point is retrieved (or interpolated) as the user's location. This approach, however, is workable only for those regions for which a survey has been conducted before hand with the location-indexed RF signature database available. More importantly, such RF signatures, though location-dependent, do not carry geometrical information about direction and distance to their sources on which no metrics can be defined and manipulated to yield steering commands.

Migrant birds and sea turtles undertake long-distance travels and repeat their routes year after year. Although animal sensory mechanisms are not fully understood yet, it is evident that the animals do not rely on a common coordinate system to navigate.

A need therefore exists (1) to represent a geo-location with radio signal characteristics measurable at that location, thus taking advantage of radio signal physical and propagation properties that are unique for each location, (2) to navigate based on the radio signal characteristics without converting it into coordinates for that location relative to a coordinate system, and (3) to steer toward a designation using the location-dependent radio signal characteristics without explicitly knowing the radio source locations relative to any geo-coordinate system. This need is met by the present invention as described and claimed below.

SUMMARY OF THE INVENTION

The present invention is a navigation and guidance method that steers a user from an initial location to a destination using a plurality of radio signals of opportunity. The disclosed method neither needs to establish a reference system before hand nor to know the coordinates of radio signal transmitters and of the destination in such a reference system, thus being coordinate-free. Instead, the disclosed method relies on measurements of radio signal parameters that are location-dependent so as to uniquely represent a location and to guide from one location to another in a manner mimicking the observed behaviors of migration birds and sea turtles. Prior-art techniques that convert radio signal measurements into coordinates for navigation and guidance suffer from local disturbances such as multipath and non light of sight (NLOS) signals. In contrast, the disclosed method stays in the measurement domain and therefore can take advantage of location-uniqueness of radio signal measurements attributed to local disturbances.

The disclosed method contains two major navigation and guidance stages, namely, coarse stage and vernier stage, respectively. The coarse stage aims at steering a user to the vicinity of a desired destination using such location-dependent radio signal parameters as received signal strength indications, differential times of arrival from a least two radio sources, and sector angles to at least a pair of radio sources that carry geometrical information about the user, radio sources, and destination. In one embodiment, a plurality of probing steps are taken around the current location to find out the best direction to move toward destination as well as the step size to take in the direction that is proportional to the changes in location-dependent radio signal parameters between the probing step and the current location.

The vernier stage occurs within the vicinity of the desired destination using such location-dependent radio signal parameters as temporal characteristics of radio signals, propagation channel impulse responses, radio signal power spectra, and propagation channel transfer functions that decorrelate quickly in space, time, and frequency, thus being a pin-point indication of a location. In one embodiment, a spatial area around current location is specified large enough to cover the destination and its vicinity. The area is then divided into a grid of search points with the spacing between two search points being commensurate with decorrelation distance of location-dependent radio signal parameters and a pre-determined threshold. A search pattern is generated to traverse the search grid and the point that produces the closest match in location-dependent radio signal parameters is considered an estimate of the destination. In another embodiment, grid points around the closest matching point are weighted to yield an estimate of the destination.

BRIEF DESCRIPTION OF THE DRAWINGS

For a better understanding of the present invention, reference is made to the following description of an exemplary embodiment thereof, considered in conjunction with the accompanying drawings wherein:

FIG. 1 is a drawing graphically illustrating an exemplary embodiment of the present invention including a coordinate-free radio navigation and guidance system that receives signals from a plurality of cellular network base stations and measures their angles of arrival (AOA) and times of arrival (TOA);

FIG. 3a is a drawing graphically illustrating the geometry for a trajectory from an initial location to a destination with probing displacement and sector angles to a plurality of radio sources at unknown locations;

FIG. 3b is a drawing graphically illustrating the curves of sector angle as a function of y for different x as well as the relationship between change in sector angle and displacement along y;

FIG. 3c is a drawing graphically illustrating the relationship between recommended displacement along y and measured change in sector angle;

FIG. 5a is a drawing graphically illustrating the geometry for a trajectory from an initial location to a destination with probing displacement and angle of arrival and relative signal strength measurements from a radio source at an unknown location;

FIG. 5b is a drawing graphically illustrating the curves of normalized range (relative signal strength) as a function of x for different angles of arrival as well as the relationship between change in normalized range and displacement along x;

FIG. 5c is a drawing graphically illustrating the curves of angle of arrival relative to a reference direction as a function of x for different angles of arrival as well as the relationship between change in angle of arrival and displacement along x;

FIG. 8 is a block diagram illustrating an exemplary embodiment of method steps for coarse navigation and guidance in accordance with the present invention.

Figure 2A:
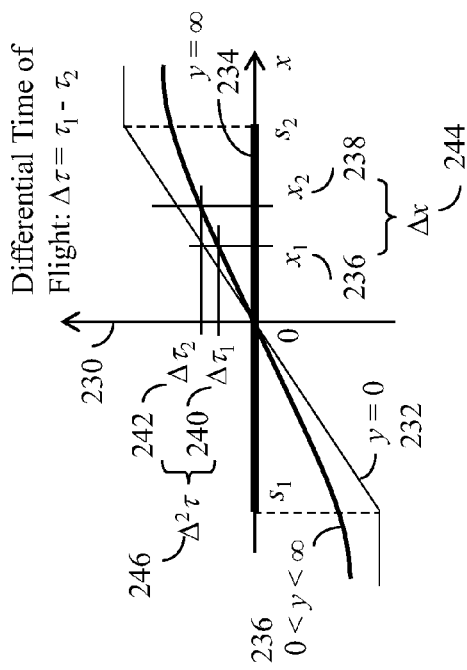
FIG. 2a is a drawing graphically illustrating the geometry for a trajectory from an initial location to a destination with probing displacement and ranges (times of flight) to radio signal sources at unknown locations.

The leading digit of each reference numeral used in this specification indicates the number of the drawing in which the reference numeral first appears.

DETAILED DESCRIPTION OF THE INVENTION

The present invention can be used for navigation and guidance of mobile users with a variety of radio signals from fixed transmitters whose locations are not known and it is particularly well suited for broadcast television (TV) and AM/FM radio signals, cellular telephone network signals, wireless local area network (WLAN or Wi-Fi) signals, terrestrial radio navigation signals such as LORAN, and even temporary radio beacons. Accordingly, an exemplary embodiment of the present invention will be described in an application to the code division multiple access (CDMA) cellular radio network signals for navigation, guidance, and control. The techniques disclosed herein are applicable to other broadcast, wireless communication, and radio navigation signals as well as a mixture thereof.

For a network of base stations in a cellular system, the present invention can be used to derive a network solution, based on measurements of the radio signals emanated from a mobile user and arriving at base stations, However, it is particularly well suited for a handset solution, based on measurements of the radio signals emanated from base stations and arriving at the mobile user. Accordingly, an exemplary embodiment of the present invention will be described without assistance from base stations and independent of the services provided by the cellular network.

Referring to FIG. 1, an exemplary embodiment 100 of the present invention is sketched wherein three neighboring base stations 102, 104, and 106 are present, each dominating a service cell 108, 110, and 112, respectively. For simplicity, only a two-dimensional (2D) coordinate system 132 is considered, which represents the underlying true but unknown geometry. The base station transceiver antennas are located at $(x_i,y_i)$, i=1, 2, 3, which are unknown to a mobile user located at $(x_0,y_0)$ 114 moving at a speed $V_0$ 116. An objective of the mobile user is to move from its current location 114 to a destination at $(x_d,y_d)$ 118. However, in a preferred coordinate free embodiment of the present invention, both the current location 114 and the destination 118 are represented by their equivalent labels $l_0 \sim (x_0,y_0)$ and $l_d \sim (x_d,y_d)$, respectively, which are location-dependent and measurable from radio signals.

Still referring to FIG. 1, consider continuously transmitting radio sources such as broadcast radio and television stations and cellular downlink (forward pilot channels). The times of arrival (TOA) of such signals 120, 122, 124 at the mobile user 114, denoted by $t_i$, i=1, 2, 3, respectively, can be easily measured in terms of the user's local clock. However, these TOA measurements per se do not convey useful information about the underlying geometry for the purposes of position location and navigation. Nonetheless, there are synchronous networks whose transmissions from base stations occur at precise times across the network. As a result, the times of flight (TOF) can be derived. For example, the pseudo range (PN) codes of a synchronous CDMA cellular network (e.g., IS95 and CDMA 2000) repeat 75 times every 2 seconds and thus coincide with the even seconds. On the other hand, with asynchronous networks, the clock offsets among source transmitters do not affect the calculation of location-specific received signal parameters so long as they remain constant over the time period of interest. This is because the clock offsets are the same within the network coverage no matter where a mobile user is located. Furthermore, for a mobile user equipped with an array antenna, the angles of arrival (AOA) of radio signals from base stations 126, 128, 130, denoted by i=1, 2, 3, respectively, can be measured relative to the antenna array. These TOA measurements carry useful information about the underlying geometry that can be used for navigation and guidance even without knowing the coordinates of the signal sources.

Referring to FIG. 2a, an exemplary embodiment for navigation and guidance using a set of location-dependent received signal parameters is illustrated in accordance with the present invention wherein a user at location $l_0$ 208 navigates to a destination $l_d$ 210 along a typically serpentine trajectory 218 in an area, defined by a 2D coordinate system 220 for analysis purpose (not known to the user). The user receives signals from three sources $s_1$ 202, $s_2$ 204, and $s_3$ 206, respectively. The times of flight from the three sources to the user, denoted by $\tau_1$ 212, $\tau_2$ 214, and $\tau_3$ 216, respectively, usually cannot be measured directly. Otherwise, the times of flight, scaled by the speed of light, produce range measurements from which the user can be located, by prior-art techniques, relative to the sources if their locations are known.

In one embodiment, a quantity that is readily available in radio receivers is the received signal strength indicator (RSSI) that is related to range. The mean value of a RSSI to three or more radio sources is unique per location. Although it cannot scale into range accurately due to various environment disturbances, it provides a metric vector that can be used to steer a user from an initial location 208 to a destination 210.

In another embodiment, the differential time of flight (TOF) from sources $s_1$ 202 and $s_2$ 204 to the user 208, denoted by $\Delta\tau_{12}=\tau_1-\tau_2$, can be derived instead from the difference between two times of arrival (TOA) $t_1$ 120 and $t_2$ 122 of FIG. 1a, respectively. Similarly, the differential TOF from sources $s_1$ 202 and $s_3$ 206, denoted by $\Delta\tau_{13}=\tau_1-\tau_3$, and from sources $s_2$ 204 and $s_3$ 206, denoted by $\Delta\tau_{23}=\tau_2-\tau_3$, can be obtained from the respective times of arrival (TOA) as well.

Figure 2C:
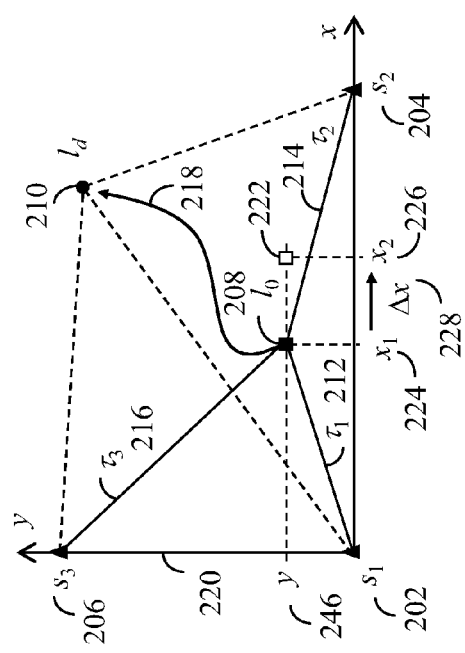
FIG. 2c is a drawing graphically illustrating the relationship between recommended displacement along x and measured change in differential time of flight.
Figure 2B:
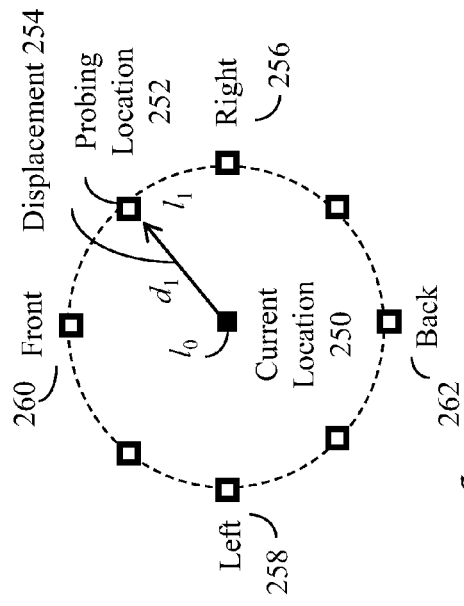
FIG. 2b is a drawing graphically illustrating the curves of differential time of flight as a function of x for different y as well as the relationship between change in differential time of flight and displacement along x.

It is well known that the differential time of flight from two sources to a receiver defines a hyperbolic line of position (LOP) and the intersection of two or more such hyperbolic lines of position determines the receiver location relative to the sources. Without knowing the locations of the sources, conventional hyperbolic positioning algorithms do not work. However, the change in differential time of flight, denoted by $\Delta^2\tau$ 246 of FIG. 2b, can be related to the user displacement, denoted by $\Delta x$ 228 of FIG. 2a (equivalently $\Delta x$ 224 of FIG. 2b), thus providing necessary guidance information to steer the user toward its destination. Referring to FIG. 2b, the differential TOF from sources $s_1$ and $s_2$ to a user, $\Delta\tau=\tau_1-\tau_2$ 230, is depicted as a function of the distance between the two sources x for different offset values y from the x-axis. When y=0, that is, the user is on the x-axis, the differential TOF is given by 232. When y=∞, the differential TOF is zero indicated by 234. For an arbitrary 0<y<∞, the differential TOF curve is given as 236 in FIG. 2b. When the user moves from $x_1$ 224 to $x_2$ 226 while keeping the same y 246, it displaces from location 208 to location 222 with a displacement $\Delta x$ 228 of FIG. 2a. Correspondingly, the differential TOF corresponding to $x_1$ 236 and $x_2$ 238 are $\Delta\tau_1$ 240 and $\Delta\tau_2$ 242, respectively, in FIG. 2b. The displacement $\Delta x$ 244 produces a change in differential TOF $\Delta^2\tau$ 246.

As a result, the differential TOF between the destination 210 and the current location 208 can be used to produce a guidance command. Referring to FIG. 2c, an exemplary guidance law is depicted in accordance with the present invention. When the differential TOF between the destination and the current location is between $\pm\Delta^2\tau_{max}$, a linear rule is used such that the next placement is proportional to the difference in the differential TOF as $\Delta x = k_x \Delta^2\tau$ where $k_x$ is a design parameter. When the difference in differential TOF between the destination and the current location is beyond the interval of $\pm\Delta^2\tau_{max}$, the maximum displacement $\Delta x_{max}$ is assumed for the next move.

Figure 2D:
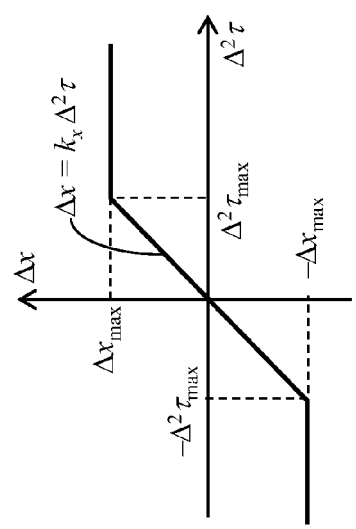
FIG. 2d is a drawing graphically illustrating the displacement from current location to a probing location.

It is clear that the differential TOF from sources $s_1$ and $s_2$ to a user determines the user's move in the direction from $s_1$ to $s_2$ (the x-axis). Similarly, the differential TOF from sources $s_1$ and $s_3$ to the user determines the user's move in the direction from $s_1$ to $s_3$ (the y-axis). So long as the directions from $s_1$ to $s_2$ and from $s_1$ to $s_3$ are not collinear, the resulting differential TOF can succeed in guiding the user to move to its designation. However, since the coordinates of $s_2$, and $s_3$ are unknown to the user, the true directions (the x- and y-axes) are unknown to the user, either, in a coordinate-free setting. A preferred method in accordance with the present invention is depicted in FIG. 2d wherein a user can take a small displacement $d_1$ 254 from its current location $l_0$ 250 to a probing location $l_1$ 252 in several directions and then determine the most likely direction. The probing directions to the right 256, left 258, front 260, and back 263 and the like 252 effectively constitute a spatial error discriminator (SED) and the most likely direction is the one that matches in sign between the probing differential TOF and the desired differential TOF to the destination. The probing attempt is the reason for serpentine trajectory 218 shown in FIG. 2a. For freely moving platforms such as airplanes, boats, and field vehicles, the probing displacement can be easily executed. However, for ground vehicles constrained on roads, moving along streets and around corners may be required for differential measurements. Instead of displacement probing in a sequential manner, another preferred method in accordance with the present invention is to use a configuration of multiple distributed antennas to search simultaneously for the most appropriate direction.

Referring to FIG. 3a, an exemplary embodiment using a second set of location-dependent received signal parameters for navigation and guidance is illustrated in accordance with the present invention wherein a user at location $l_0$ 308 navigates to a destination $l_d$ 310 along a typically serpentine trajectory 318 in an area, defined by a 2D coordinate system 328 not known to the user. The user receives signals from three sources $s_1$ 302, $s_2$ 304, and $s_3$ 306, respectively. The angles of arrival (AOA) from the three sources $\alpha_1$ 126, $\alpha_2$ 128, and $\alpha_3$ 130 of FIG. 1a, respectively, measured by the user equipped with an array antenna, can be used to form sector angles (i.e., the angles subtended by two stations at the user location) from sources $s_1$ 302 and $s_2$ 304 to the user 308, denoted by $\theta_{12}=\pi-\alpha_1-\alpha_2$, and from sources $s_1$ 302 and $s_3$ 306 to the user 308, denoted by $\theta_{13}=\alpha_1+\alpha_3$, respectively.

Without knowing the locations of the sources, neither the angles of arrival nor the sector angles can determine the user's location via prior-art triangulation techniques. However, the change in a sector angle $\theta_{12}$ 314, denoted by $\Delta\theta$ 346 of FIG. 3b, can be related to the user displacement, denoted by $\Delta y$ 326 of FIG. 3a (equivalently $\Delta y$ 344 of FIG. 3b), thus providing necessary guidance information to steer the user toward its destination. Referring to FIG. 3b, the sector angle from sources $s_1$ and $s_2$ to a user, $\theta_{12}$ 330, is depicted as a function of the distance between the two sources y for different offset values x from the y-axis. When $x=s_1$, that is, the user is on the y-axis, the sector angle is given by the curve 332. When $x=s_2$, the sector angle is given by the curve 334. For an arbitrary 0<x<∞, the sector angle curve is between those of 332 and 334. When the user moves from $y_1$ 322 to $y_2$ 324 while keeping the same x 320, it displaces from location 308 to location 318 with a displacement $\Delta y$ 326 of FIG. 3a. Correspondingly, the sector angle at $y_1$ 336 and $y_2$ 338 are $\theta_1$ 342 and $\theta_2$ 340, respectively, in FIG. 3b. The displacement $\Delta y$ 344 produces a change in sector angle $\Delta\theta$ 346.

Consequently, the sector angle at the destination 310 and at the current location 308 can be used to produce a guidance command. Referring to FIG. 3c, an exemplary guidance law is depicted in accordance with the present invention. When the difference between the sector angle at the destination 310 and at the current location 308 is between $\pm\Delta\theta_{max}$, a linear rule is used such that the next placement is proportional to the difference in sector angle as $\Delta y = k_y \Delta\theta$ where $k_y$ is a design parameter. When the difference of sector angle at the destination and at the current location is beyond the interval of $\pm\Delta\theta_{max}$, the maximum displacement $\Delta y_{max}$ is assumed for the next move.

The sector angle to sources $s_1$ and $s_2$ from a user determines the user's move perpendicular to the direction from $s_1$ to $s_2$ (the y-axis). Similarly, the sector angle to sources $s_1$ and $s_3$ from the user determines the user's move perpendicular to the direction from $s_1$ to $s_3$ (the x-axis). So long as the directions from $s_1$ to $s_2$ and from $s_1$ to $s_3$ are not collinear, the resulting sector angles can guide the user to reach its designation. However, since the coordinates of $s_1$, $s_2$, and $s_3$ are unknown to the user, the true directions (the x- and y-axes) are unknown to the user in a coordinate-free setting. The preferred method of spatial error discriminator (SED) depicted in FIG. 3c is applied in accordance with the present invention, which produces the most likely direction to move using either displacement probing in a sequential manner or a configuration of multiple distributed array antennas to search simultaneously.

Figures 4A, 4B:
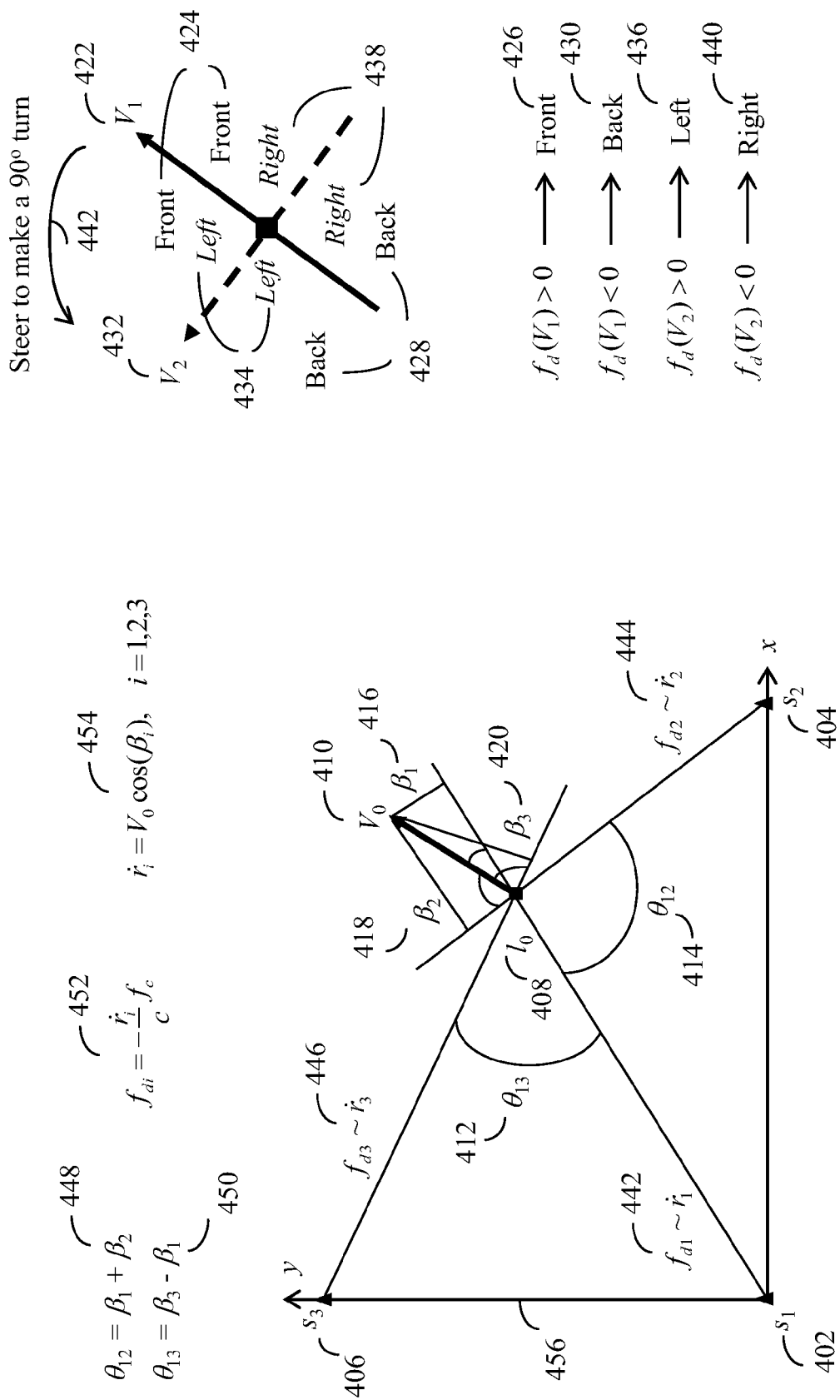
FIG. 4a is a drawing graphically illustrating the geometry for estimating sector angles from Doppler frequency shifts of a plurality of radio signal sources.
FIG. 4b is a drawing graphically illustrating the geometry for resolving sign ambiguity with two velocity vectors.

For mobile users that are not equipped with an array antenna, angles of arrival can be estimated by means of differential Doppler measurements as depicted in FIG. 4a in accordance with the present invention. A mobile user at $l_0$ 408 is moving at a speed $V_o$ 410 in an area defined a 2D coordinate system 456 not known to the user. The speed $V_o$ 410 can be determined using an odometer for instance rather easily but not the heading relative to the 2D coordinate system 456, which is unknown to the user. However, the user can track the radio signals from the sources $s_1$ 402, $s_2$ 404, and $s_3$ 406 and measure their Doppler frequency shifts $f_{d1}$ 442, $L_{d2}$ 444, and $f_{d3}$ 446, respectively. Given the known speed $V_o$ 410, the Doppler frequency shifts, which are related to their range rates $\dot{r}_1$ 442, $\dot{r}_2$ 444, and $\dot{r}_3$ 446 via equation 452, can be used to estimate the angles between the velocity vector and the line of sight vectors, denoted by $\beta_1$ 416, $\beta_2$ 418, and $\beta_3$ 420, via equation 454. Finally, the sector angles to sources $s_1$ 402 and $s_2$ 404 (i.e., $\theta_{12}$ 414) and to sources $s_1$ 402 and $s_3$ 406 (i.e., $\theta_{13}$ 412) from the user 408 can be determined from the angles between the velocity vector and the line of sight vectors $\beta_1$ 416, $\beta_2$ 418, and $\beta_3$ 420, via equations 448 and 450, respectively.

Referring to FIG. 4b, the 2D velocity vector $V_1$ 422 has four quadrants, namely, front-right, front-left, back-right, and back-left, respectively. The use of equations 448 and 450 to calculate sector angles needs to know which quadrant a line of sight vector lies. However, the sign of a Doppler frequency shift L can only indicate if the angle between the velocity vector and a line of sight vector is less than 90° (front 424) or more than 90° (back 428) but cannot distinguish left 434 from right 438 (because the cosine is an even function and thus symmetric about the velocity vector). A preferred method in accordance with the present invention is to steer the velocity vector by 90° 442 from $V_1$ 422 to $V_2$ 432. The sign of a signal's Doppler frequency shift under $V_1$ 422 indicates if it is up front 426 or at back 430. The sign of Doppler frequency shift of the same signal under $V_2$ 432 indicates if it is on the left 436 or on the right 440, thus uniquely determining the quadrant. Such a maneuver is needed to solve the sign ambiguity, which is typically done once at the start of an excursion or when a new signal is detected.

The differential time of flight from two sources to a receiver $\Delta\tau$ and the sector angle from the receiver to two sources $\theta$ are two possible sets of parameters that can be measured directly from the received signals without the need to know the source locations yet they are specific to the receiver location relative to the sources. For synchronous sources such as base stations in a cellular CDMA network, the calculation of differential times of flight from times of arrival of individual signals is straightforward. For asynchronous sources, however, clock biases exist among signal sources. Without calibration, the resulting differential times of flight are biased. Such biases are detrimental to conventional position location, further magnified by the factor of geometric dilution of precision (GDOP). But it is inconsequential to generating the steering commands in accordance with the present invention for constant or slow-varying biases are cancelled in the change of differential time of flight $\Delta^2\tau$ and changes in sector angle $\Delta\theta$.

In one embodiment, the time of arrival of a signal is measured by tracking the incoming pseudo random (PN) code modulated on the carrier (i.e., code phase-based timing). In another embodiment, the change in carrier phase (accumulated Doppler) is used to measure the change in differential time of flight at two locations (i.e., carrier phase-based timing). That is, the change in carrier phase minus the nominal value of cycles over the same time interval is counted in terms of integer and fractional numbers of cycles as the receiver moves from one location to another. With an array antenna, the tracked carrier phases from the array elements are used to find the angle of arrival using a search method such as the MUSIC algorithm in one embodiment or via digital beamforming monopulse in another embodiment. Yet in another embodiment, the sector angle is estimated based on Doppler frequency shifts given the ground speed of the receiver. The techniques of tracking carrier phase, Doppler frequency, and code phase of radio signals relevant to the present invention are well known to those of ordinary skill in the art.

Referring to FIG. 5a, an exemplary embodiment using received signal strength indicators (RSSI) and angles of arrival relative to a reference direction from a single radio source at an unknown location 506 is illustrated for a user to navigate from an initial location 502 to a destination 504 in accordance with the present invention. Each received signal strength indicator (RSSI) places the user along one of the iso-range circles 510a through 510e around the source 506 whereas each angle of arrival relative to a reference direction 508, places the user along a radial line of position (LOP) 512a through 512g. Locally, the radial line of position (LOP) corresponding to an AOA is perpendicular to the iso-range circle corresponding to a RSSI. Clearly, the set of RSSI and AOA measurements at the initial location 502 is unique and different from that at destination 504, thus providing directional information to issue steering commands.

Indeed, the change in relative range $\Delta r$ 520 (change in RSSI) is related to displacement $\Delta x$ 522 along the x-axis, as illustrated in FIG. 5b wherein the normalized range 514 is plotted again x 516 for a number of angles of arrival from 0° 518a, between 0° and 90° 518b, and 90° 518c, respectively.

Similarly, referring to FIG. 5c, the change in AOA $\Delta\theta$ 530 is related to displacement $\Delta x$ 532 along the x-axis for a number of angles of arrival from 0° 528a, between 0° and 90° 528b, and 90° 528c, respectively, plotted as AOA 524 versus x 526 in FIG. 5c. Similar curves can be plotted in the y-axis. Together, they form the spatial error discriminators (SED) similar to those shown FIGS. 2c and 3c that generate guidance (steering) commands to navigate (displacement).

In complex indoor and urban environments, the measured signal strength, time of flight, and angle of arrival may not necessarily correspond to the true geometric line of sight (LOS) ranges and angles from the receiver to signal sources due to the presence of multipath and non line of sight (NLOS) signals in addition to thermal noise and frequency instability on the part of receiver and transmitters alike. However, on a large scale, the measured signal strength, time of flight, and angle of arrival can be used to approximate the underlying geometric line of sight (LOS) ranges and angles for guidance as illustrated in FIGS. 2, 3, and 5 when the approximation errors are small compared to the separation of a user to its destination. On a local scale, however, when the approximation errors are comparable to the separation of a user to its destination, the second-order effects due to multipath and the like become significant for prior-art techniques but are taken advantage of for navigation and guidance with the present invention.

It is well known that the presence of multipath creates spreads of the received radio signals in time, frequency, and arrival angle and such spreads are unique for each signal propagation channel consisting of the transmitter, propagation environment, and receiver. A signal propagation channel decorrelates quickly in time, space, and frequency and such unpredictability prevents the use of practical metrics to extract directional information for steering (guidance) unless within the vicinity of destination. By consequence, a preferred approach of the present invention makes use of (1) the received signal parameters vector, namely, the received signal strength, differential time of flight, sector angle, or a combination thereof, for coarse navigation and guidance and (2) the signal propagation channel parameters vector for vernier navigation and guidance via spatial search and matching.

A signal propagation channel can be characterized in terms of an impulse response in the time domain or equivalently a transfer function in the frequency domain. The two representations are related to each other by the Fourier transform (FT) and the inverse Fourier transform (IFT) vice versa. A preferred method for estimating signal propagation channel parameters is disclosed in the U.S. Pat. No. 7,471,241, entitled Global Navigation Satellite System (GNSS) Receivers Based on Satellite Signal Channel Impulse Response, issued Dec. 30, 2008 to a co-inventor of the present invention, which is hereby incorporated into this specification by reference.

In one embodiment, the spatial search to match signal propagation channel parameters in the vicinity of a destination (commensurate with the spatial decorrelation distance and the average multipath-induced errors) is implemented using sequential displacement probing. In another embodiment, a configuration of multiple distributed antennas is used for simultaneous search. These effectively constitute a multiple-input and single-output (MISO) system and a multiple-input and multiple-output (MIMO) system, respectively. Such spatial diversity has been explored to enhance signal strength and communication capacity and for signal authentication and position localization. A number of robust statistical methods for matching location-dependent radio signal parameters and their performance evaluation were disclosed by the co-inventors of the present invention in a paper entitled "Location-Dependent RF Geotags for Positioning and Security" presented at SPIE Defense, Security, and Sensing, Orlando, Fla., April 2011, which is incorporated into this specification by reference.

Figure 6:
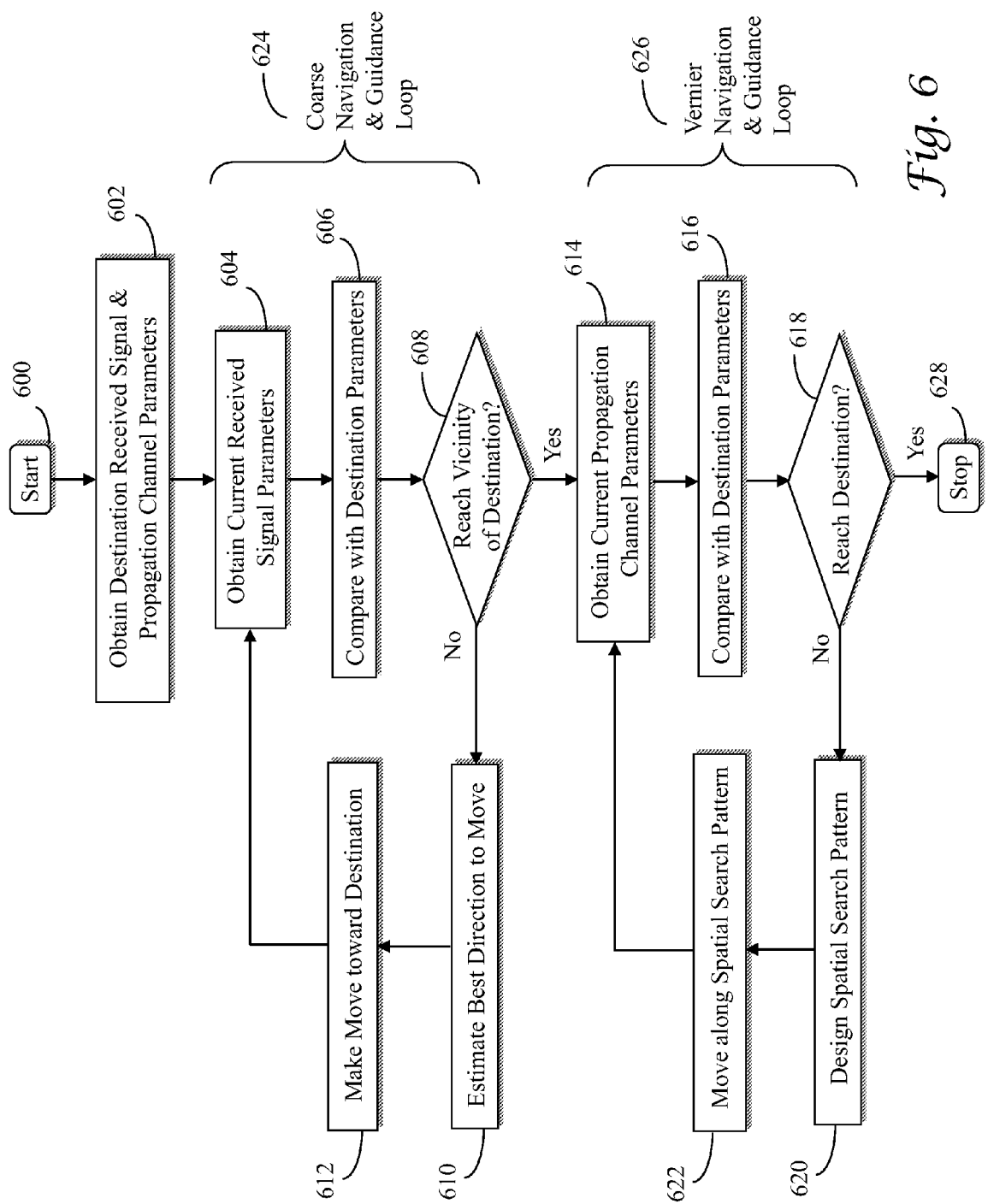
FIG. 6 is a flowchart illustrating an exemplary embodiment of method steps for coarse and vernier navigation and guidance loops in accordance with the present invention.

Referring to FIG. 6, an exemplary embodiment of method steps for coarse and vernier navigation and guidance is illustrated by means of a flowchart in accordance with the present invention. Upon start 600, the first step 602 is to obtain a set of received signal parameters and a set of propagation channel parameters for the destination. The coarse navigation and guidance loop 624 is then entered wherein the first step is to obtain current set of received signal parameters 604, to be described later in conjunction with FIGS. 7 and 8 in this specification. The measured current set is then compared with the destination's set in block 606. A threshold test is made in block 608 and if the two sets do not match (i.e., not in the vicinity of destination), the next step is to estimate a best direction to move 610, make the move toward the destination 612, and repeat the measurement-taking and decision-making steps 604 through 608 in a loop.

Still referring to FIG. 6, if the two sets do match in the threshold test block 608 (i.e., in the vicinity of destination), the vernier navigation and guidance loop 626 is entered wherein the first step is to obtain current set of propagation channel parameters 614. The next step is to compare the measured current set with the destination's set in block 616. Again a threshold test is made in block 618 and if the two sets do not match (i.e., not reach the destination yet), the next step is to design a spatial search pattern 620, make a move along the spatial search pattern n 622, and repeat the measurement-taking and decision-making steps 614 through 618 in a loop. If the two sets do match in the threshold test block 618, the process is successfully terminated with the destination reached at the stop 628.

Figure 7:
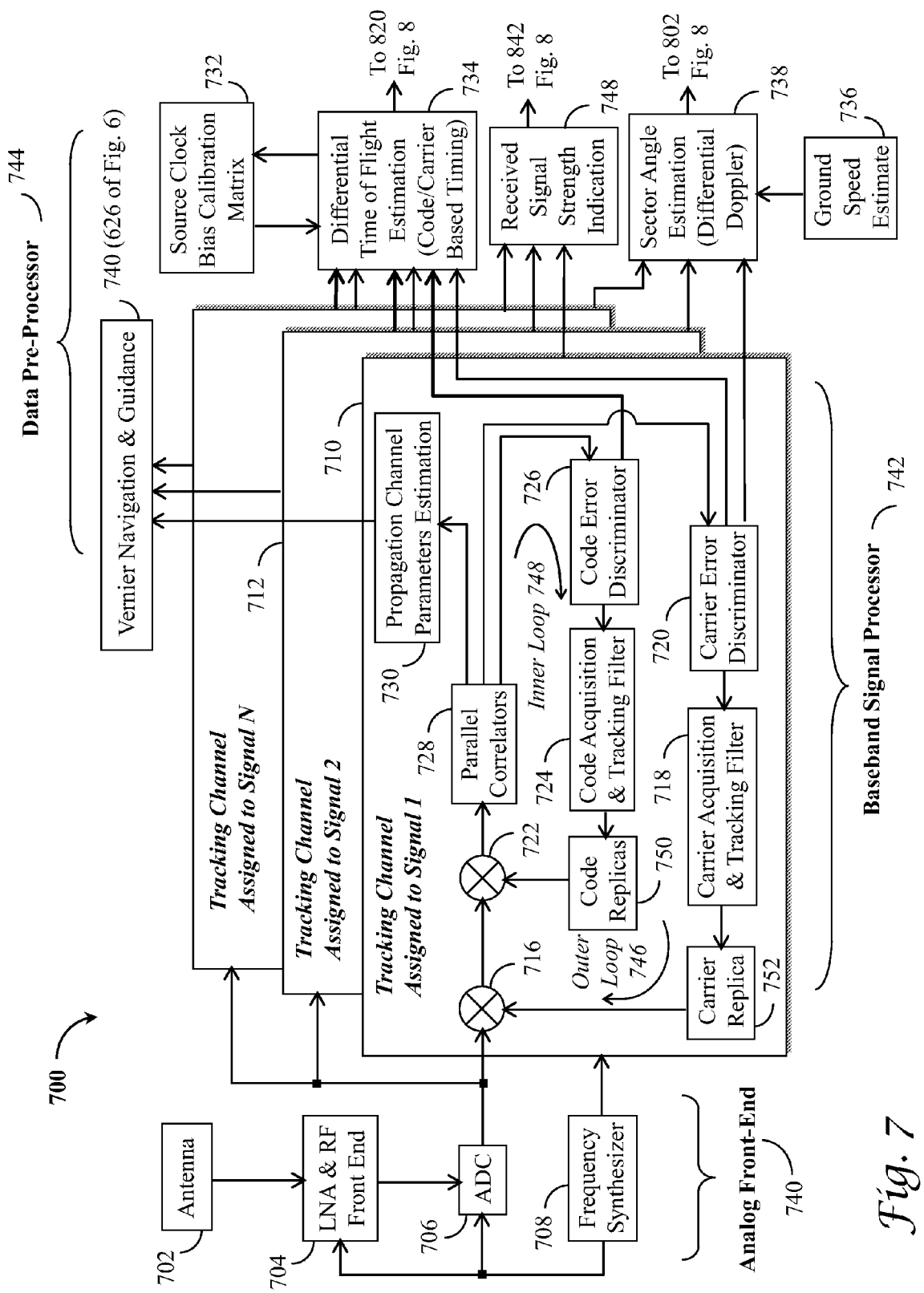
FIG. 7 is a schematic illustrating the architecture of an exemplary embodiment of an analog front end, a baseband signal processor, and a data pre-processor in accordance with the present invention.

Referring to FIG. 7, an exemplary embodiment 700 of the architecture of an analog front end 740, a baseband signal processor 742, and a data pre-processor 744 is illustrated in accordance with the present invention. The analog front end 740 consists of an antenna 702, a low-noise amplifier (LNA) and radio frequency (RF) front end 704, and an analog to digital converter (ADC) 706. The antenna 702 captures radio signals, which are processed in the RF front end 704, with stages of bandpass-filtering, amplification, and down-conversion, into a suitable intermediate frequency (IF) for sampling by the ADC 706. A frequency synthesizer 708 is used to provide the required frequency components to the RF front end 704 and ADC 706 as well as the baseband signal processor 742.

Still referring to FIG. 7, a plurality of tracking channels 710, 712, and 714 are implemented in the baseband signal processor 742, each assigned to a received signal. A tracking channel consists of an outer loop 746 for carrier acquisition and tracking and inner loop 748 for code acquisition and tracking. The outer carrier loop 746 consists of a carrier (frequency and phase) error discriminator 720, a carrier tracking filter 718, a carrier replica generator 752, and a carrier mixer 716, which removes residual Doppler frequency from the incoming signal samples. The inner code loop 748 consists of a code error discriminator 726, a code tracking filter 724, a code replica generator 750, and a carrier mixer 722, which strips spreading codes from the incoming signal samples. The tracking loops are closed by parallel correlators, whose outputs are used to drive code and carrier error discriminators 726 and 720, respectively. An initial search is required to acquire the code phase and carrier frequency prior to loop closure. The parallel correlators are also used for propagation channel parameters estimation 730. The estimated propagation channel parameters from all tracking channels 710, 712, and 714 are used for vernier navigation and guidance 740 (also see loop 626 of FIG. 6).

Again referring to FIG. 7, a data pre-processor 744 comprises a vernier navigation and guidance block 740, differential time of flight estimation 634, sector angle estimation 738, and received signal strength indication 748. From the carrier tracking loop 746 of different tracking channels 710, 712, and 714, the Doppler measurements are used to estimate sector angles 738 given a ground speed estimate 736. The sector angles are sent for use in coarse navigation and guidance loop 624 of FIG. 6 or equivalently to block 802 of FIG. 8. Similarly, either from the carrier tracking loop 746 or code tracking loop 748 of different tracking channels 710, 712, and 714, the code or carrier phase measurements are used to estimate differential times of flight 734. The estimated differential times of flight may be compensated for source clock biases if the calibration matrix 732 is available. Conversely, the estimate differential times of flight can be used to build a source clock bias calibration matrix 732 if the location of the sources and receiver are known. The differential times of flight are sent for use in coarse navigation and guidance loop 624 of FIG. 6 or equivalently to block 820 of FIG. 8. From different tracking channels 710, 712, and 714, the received signal strength indication 748 is obtained and fed to coarse navigation and guidance loop 624 of FIG. 6 or equivalently to block 842 of FIG. 8.

The techniques for design and construction of antenna, RF front-end, ADC, frequency synthesizer, parallel correlators, code and carrier error discriminators, code and carrier tracking loops, and code and carrier replica generators that possess the characteristics relevant to the present invention are well known to those of ordinary skill in the art.

Now referring to FIG. 8, an exemplary embodiment 800 of method steps for coarse navigation and guidance is illustrated in accordance with the present invention. Current sector angle estimates 802 are obtained either from block 738 of FIG. 7 via a path 806 or based on array antenna AOA estimates 804. The current sector angle estimates 802 are compared to the set of destination parameters 808, yielding errors to go 810. Furthermore, the current sector angle estimates 802 are compared to the previous sector angle estimates 812, producing the change in sector angles 814. The errors to go and the change in sector angles are processed to find best step and direction to move 818.

Still referring to FIG. 8, current differential time of flight estimates 820 are obtained either based on code phase 726 from 734 via 824 or based on carrier phase 720 from 734 via 822. The current differential time of flight estimates 820 are compared to the set of destination parameters 826, yielding errors to go 828. Furthermore, the current differential time of flight estimates 820 are compared to the previous differential time of flight estimates 830, producing the change in differential time of flight 832. The errors to go and the change in differential times of flight are processed to find best step and direction to move 834.

Again referring to FIG. 8, current received signal strength estimates 842 are obtained from 748 via 844. The current received signal strength estimates 842 are compared to the set of destination parameters 852, yielding errors to go 850. Furthermore, the current received signal strength estimates 842 are compared to the previous received signal strength estimates 846, producing the change in received signal strength 848. The errors to go and the change in received signal strength are processed to find best step and direction to move 854. At this point, a switch 838 is used to select from a sector angle-based solution 818, a differential time of flight-based solution 834, a received signal strength solution 856 or a weighted solution 836 to serve as a steering command 840. Simulation results of the invention methods are disclosed in a paper entitled "Geo-Coordinate Free Guidance and Navigation," presented by the co-inventor at the ION-GNSS meeting in September 2010 at Portland, Oreg., which is incorporated into this specification by reference.

Although the description above contains much specificities, these should not be construed as limiting the scope of the invention but as merely providing illustrations of some of the presently preferred embodiments of this invention. For example, the present invention provides a generic signal processing architecture where many processing steps can be tailored to achieve a desired combination of functionalities. As a result, some steps may be made optional and others are omitted. As a preferred method, a simple linear-saturation type of gain is used in guidance law to generate steering commands. A more sophisticated adaptive gain may be used instead. It is possible to design the guidance law using fuzzy logic.

Reference has been made mostly to CDMA cellular network signals but the present invention is equally applicable to broadcast television, radio, wireless local area network (WLAN), and other broadcast and communication signals. As a preferred embodiment, the use of differential time of flight, received signal strength, and sector angle measurements is described in detail in the present specification. However, other signal characteristics can be used. Similarly, there is no need to use all the signals in the destination parameters vector and not all signals may be available simultaneously. Furthermore, the use of radio signals in the present invention may be integrated with other sensors such as inertial sensors and laser range finders. In addition to rendezvous, a guidance law can be designed for formation control and maneuvering platform cooperation.

The coordinate-free navigation and guidance of the present invention can be easily reconfigured to operate within a coordinate system if the coordinates of all signal sources are made available. Similarly, clock bias calibration matrix can be built for asynchronous networks. The received signal and propagation channel parameters can be considered as an additional layer on top of a vector map, effectively building a database of location signatures.

It is understood that the various figures described above illustrated only the preferred embodiments of the present invention system and method. A person skilled in the art can therefore make numerous alterations and modifications to the described embodiments utilizing functionally equivalent components and method steps to those shown and described. All such modifications are intended to be included within the scope of the present invention as defined by the appended claims.

What is claimed is:

1. A method of directing a user from an initial location to a destination location in an area containing a plurality of radio signals of opportunity and without knowing coordinates for transmitters of said plurality of radio signals of opportunity, said method comprising the steps of:
   obtaining a first set of location-dependent radio signal parameters for said destination location from said plurality of radio signals of opportunity;
   measuring subsequent sets of location-dependent radio signal parameters for a plurality of points away from said initial location;
   comparing said subsequent sets of location-dependent radio signal parameters with said first set of location-dependent radio signal parameters to produce a location-dependent radio parameter matching error;
   generating a directional command for a move if said radio signal parameter matching error exceeds a pre-determined threshold; and
   updating said directional command until said radio signal parameter matching error falls within a pre-determined threshold.

2. The method according to claim 1, wherein said plurality of radio signals of opportunity are selected from a group consisting of broadcast radio signals, digital television signals, cellular mobile phone network signals, wireless communications signals, and radio-frequency beacons and transponders.

3. The method according to claim 1, wherein said location-dependent radio signal parameters of both said first set and said subsequent sets are selected from a group consisting of temporal characteristics of radio signals, propagation channel impulse responses, radio signal power spectra, and propagation channel transfer functions when in a predetermined vicinity of said destination and from a group consisting of received signal strength indications, time differences of arrival, and sector angles when beyond said predetermined vicinity of said destination location.

4. The method according to claim 1, wherein said step of measuring subsequent sets of location-dependent radio signal parameters, further includes the substeps of:
   capturing said plurality of radio signals of opportunity;
   down-converting said plurality of radio signals of opportunity from radio frequency to an intermediate frequency suitable for analog to digital conversion; and
   extracting said radio signal parameters from said down-converted digital signals.

5. The method according to claim 4, wherein said step of extracting said radio signal parameters, further includes the substeps of:
   tracking a carrier signal for said down-converted digital signals using a tracking loop selected from a group of a phase-locked loop (PLL), a frequency-locked loop (FLL), and an FLL-assisted PLL, yielding carrier phase and Doppler frequency measurements; and
   tracking a code signal for said down-converted digital signals using a tracking loop selected from a group of a delay-locked loop (DLL) and a carrier-assisted DLL, yielding code phase measurements.

6. The method according to claim 5, wherein said step of tracking a code signal, further includes the substeps of:
   correlating a code modulated for said down-converted digital signals with a plurality of locally generated code replicas, each at a different code phase, producing a correlation peak;
   tagging said correlation peak with a time stamp of a local clock as an estimate of a time of arrival;
   calculating a difference between times of arrival from at least a pair of radio signals from said plurality of radio signals of opportunity, producing an estimated time difference for arrival;
   scaling and averaging correlation peaks over a certain period of time, producing an estimate of said received signal strength indication; and
   scaling and averaging correlation peaks over said plurality of code phases, producing an estimate of said propagation channel impulse response.

7. The method according to claim 5, wherein said step of extracting said radio signal parameters, further includes the substeps of:
   transforming said down-converted digital signals into frequency domain, yielding a frequency domain representation of said down-converted digital signals;
   scaling and averaging said frequency domain representation over a certain period of time, producing an estimate of said radio signal power spectra;
   transforming said locally generated code replica into frequency domain, yielding a frequency domain representation of code replica; and
   dividing said frequency domain representation of signal by said frequency domain representation of code replica on a frequency bin by frequency bin basis while excluding those frequency bins at which the denominator is very small, producing an estimate of said propagation channel transfer function.

8. The method according to claim 5, wherein said step of extracting said radio signal parameters, further includes the substeps of:
   obtaining carrier phase measurements from a plurality of carrier tracking loops, each connected to an array element for a user equipped with an array antenna;
   estimating angles of arrival from said carrier phase measurements of individual array elements; and
   calculating the difference of said angles of arrival for at least a pair of radio signals from said plurality of radio signals of opportunity, producing an estimate of said sector angle.

9. The method according to claim 5, wherein said step of extracting said radio signal parameters, further includes the substeps of:
   obtaining Doppler frequency measurements from a plurality of carrier tracking loops for a user not equipped with an array antenna;
   obtaining a ground speed measurement from a sensor group consisting of an odometer, a visual odometer (optical flow), an integrated accelerometer, a laser scanner, and a radar velocimeter;
   obtaining an estimate of angle of arrival from said Doppler frequency and speed measurements, and
   calculating a difference between said angles of arrival for at least a pair of radio signals from said plurality of radio signals of opportunity, producing an estimate of said sector angle.

10. The method according to claim 9, wherein said step of obtaining an estimate of angle of arrival from said Doppler frequency and speed measurements, further includes the substeps of:
   scaling said Doppler measurement by said speed measurement, yielding an estimate of angle of arrival with a sign ambiguity; and
   solving for a sign ambiguity by taking measurements after making a turn.

11. The method according to claim 1, wherein said step of producing a location-dependent radio parameter matching error, further includes the substeps of:
   determining a search pattern for a next move if in a predetermined vicinity of said destination; and
   determining a direction and step for a next move if beyond said predetermined vicinity.

12. The method according to claim 11, wherein said step of determining a search pattern for a next move, further includes the substeps of:
   covering a spatial area around said current location with a grid of search points large enough to cover said destination location and its vicinity wherein spacing between said search points is proportional to decorrelation distance and commensurate with said pre-determined threshold; and
   taking location-dependent radio signal parameters from said group in the vicinity of said destination location.

13. The method according to claim 11, wherein said step of determining the direction and step for a next move, further includes the substeps of:
   selecting a plurality of probing points around said current location;
   taking location-dependent radio signal parameters from said group beyond said predetermined vicinity of said destination location at said probing points; and
   finding a direction for said next move.

14. The method according to claim 13, wherein said step of finding the direction for a next move, further includes the substeps of:
   comparing measured location-dependent radio signal parameters at said probing points with those at said destination location, yielding errors to go;
   selecting a probing point that produces a smallest error to go as a direction for a next move for each measured location-dependent radio signal parameter; and
   combining at least some probing points for all measured location-dependent radio signal parameters by proper weighting, yielding the direction for said next move.

15. The method according to claim 13, wherein said step of finding a step for a next move, further includes the substeps of:
   comparing measured location-dependent radio signal parameters at said probing points with those taken prior to yield changes in location-dependent radio signal parameters;

scaling said change in a location-dependent radio signal parameter into a step for next move for each measured location-dependent radio signal parameter; and combining steps for all measured location-dependent radio signal parameters by proper weighting, yielding a subsequent step for said next move.

16. The method according to claim 1, wherein said step of generating a steering command for a move, further includes selecting from a best direction derived from individual radio signal parameters.

17. The method according to claim 1, wherein said step updating said directional command, further includes the sub-steps of:

traversing said search grid while matching measured and given location-dependent radio signal parameters;

selecting a closest match point and neighboring grid points; and weighting said closest match point and said neighboring grid points according to matching values to yield an estimate of said destination location.

* * * * *